United States Patent
Machens et al.

(10) Patent No.: US 6,616,162 B2
(45) Date of Patent: Sep. 9, 2003

(54) COUPLING OF AN AXLE MEMBER TO A VEHICLE LEAF SPRING OR A LONGITUDINAL LINK

(75) Inventors: Kai-Ulrich Machens, Stuttgart (DE); Thomas F. Schreiber, Weinstadt (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/882,385

(22) Filed: Jun. 15, 2001

(65) Prior Publication Data

US 2002/0015616 A1 Feb. 7, 2002

(30) Foreign Application Priority Data

Jun. 15, 2000 (DE) .......................................... 100 29 639

(51) Int. Cl.⁷ ............................................... B60G 11/12
(52) U.S. Cl. ........................ 280/124.175; 280/124.144; 280/124.169; 267/153
(58) Field of Search .................... 280/124.144, 124.169, 280/124.17, 124.175, 124.177; 267/153, 166.1

(56) References Cited

U.S. PATENT DOCUMENTS

| | | | |
|---|---|---|---|
| 3,294,415 A | | 12/1966 | Allison |
| 3,877,718 A | * | 4/1975 | Scanlon et al. .......... 180/24.02 |
| 3,902,734 A | * | 9/1975 | Fier ............................ 267/262 |
| 4,032,125 A | | 6/1977 | Minakawa et al. |
| 4,078,276 A | * | 3/1978 | Nunes .......................... 16/271 |
| 4,131,297 A | * | 12/1978 | Raidel ........................ 280/682 |
| 4,200,267 A | * | 4/1980 | King ............................. 267/52 |
| 4,278,030 A | * | 7/1981 | Ahlborn et al. .......... 105/190.2 |
| 4,390,189 A | * | 6/1983 | Kunau ......................... 280/686 |
| 4,699,065 A | * | 10/1987 | Kibble ..................... 105/199.5 |
| 4,858,949 A | * | 8/1989 | Wallace et al. ........ 280/124.116 |
| 5,080,334 A | * | 1/1992 | Mihara et al. ............ 267/141.1 |
| 5,320,192 A | * | 6/1994 | Hayashida et al. .......... 180/414 |
| 5,354,091 A | * | 10/1994 | Baxter et al. ............... 267/37.2 |
| 5,380,036 A | | 1/1995 | Perkins et al. |
| 5,681,998 A | * | 10/1997 | Nakazaki et al. ........ 177/210 R |
| 5,971,654 A | * | 10/1999 | Sweeney, Jr. ................ 280/686 |
| 5,996,981 A | * | 12/1999 | Dilling ........................ 267/141 |
| 6,082,750 A | * | 7/2000 | Merkler et al. .............. 267/260 |
| 6,224,074 B1 | * | 5/2001 | Cadden ....................... 280/678 |

FOREIGN PATENT DOCUMENTS

| | | | |
|---|---|---|---|
| DE | 1 233 283 | 8/1967 | |
| DE | 38 41 846 | 6/1990 | |
| FR | 1 462 902 | 3/1967 | |
| JP | 1053013 | * 2/1998 | .................. 280/17 |

* cited by examiner

Primary Examiner—Paul N. Dickson
Assistant Examiner—Toan C To
(74) Attorney, Agent, or Firm—Kenyon & Kenyon

(57) ABSTRACT

In a coupling of an axle member to a vehicle leaf spring or a longitudinal link, the axle member is coupled to a vehicle leaf spring or a longitudinal link with spring/damper elements therebetween. Arranged between the axle member and the vehicle leaf spring or the longitudinal link are at least two spring/damper elements, which, in the direction of travel, are arranged in front of and behind the section of the axle member to which the leaf spring or the longitudinal link is coupled. The stiffness of the spring/damper elements is greater in the horizontal directions than in the vertical direction. Vibrations of the body of a vehicle with a rigid axle that are caused by the vehicle drive, irregularities in the roadway and unbalance of the wheels are minimized.

10 Claims, 2 Drawing Sheets

COUPLING OF AN AXLE MEMBER TO A VEHICLE LEAF SPRING OR A LONGITUDINAL LINK

FIELD OF THE INVENTION

The invention relates to the coupling of an axle member to a vehicle leaf spring or a spring-loaded longitudinal link.

BACKGROUND INFORMATION

German Published Patent Application No. 38 41 846 describes a coupling between an axle and a leaf spring, in which the leaf spring is clamped centrally between elastomer bodies at the point of intersection with the axle. The coupling between the elastomer bodies and the leaf spring is achieved by frictional engagement. Due to the short spring travel in the vertical direction and in the transverse direction, the stiffness of the system is greater in these two directions than in the longitudinal direction.

The compliance in the longitudinal direction is superimposed on the compliance of the suspension to give an amount that results in an unwanted longitudinal shift of the axle, especially in the case of load reversals.

It is an object of the present invention to minimize the vibrations of the body of a vehicle with a rigid axle that are excited by the vehicle drive, irregularities in the roadway and unbalance of the wheels. According to the present invention, the rigid axle is coupled to the body by leaf springs or longitudinal links. To improve ride comfort, the vibration-damping elements may be harder in the transverse and longitudinal directions than in the vertical direction.

SUMMARY

The above and other beneficial objects of the present invention are achieved by providing a coupling as described herein. The axle member is coupled to a vehicle leaf spring or a longitudinal link with spring/damper elements therebetween. Arranged between the axle member and the vehicle leaf spring or the longitudinal link are at least two spring/damper elements, which, in the direction of travel, are arranged in front of and behind the section of the axle member to which the leaf spring or the longitudinal link is coupled. The stiffness of the spring/damper elements is greater in the horizontal directions than in the vertical direction.

The structure-borne noise energy that excites the rigid axle to vibrate is produced primarily by the engine and by the drive line and introduced into the rigid axle via the differential. Similarly, the transmission of structure-borne noise produced by other types of excitation, such as irregularities in the roadway and unbalance of the wheels, from the rigid axle to the body is reduced.

The soft coupling in the vertical direction results in damping or deadening of structure-borne noise transmission and thus of the noise within the vehicle. In addition, this arrangement is unproblematic for ride dynamics. The hard connection in the transverse and longitudinal directions of the vehicle is advantageous for the ride dynamics. This coupling may be used for single- and multi-layer leaf springs with and without interlayers, quarter and three-quarter elliptic springs, semi- and full elliptic springs, parallel arrangement of a main spring with an additional spring, etc.

DETAILED DESCRIPTION

Figure 1:
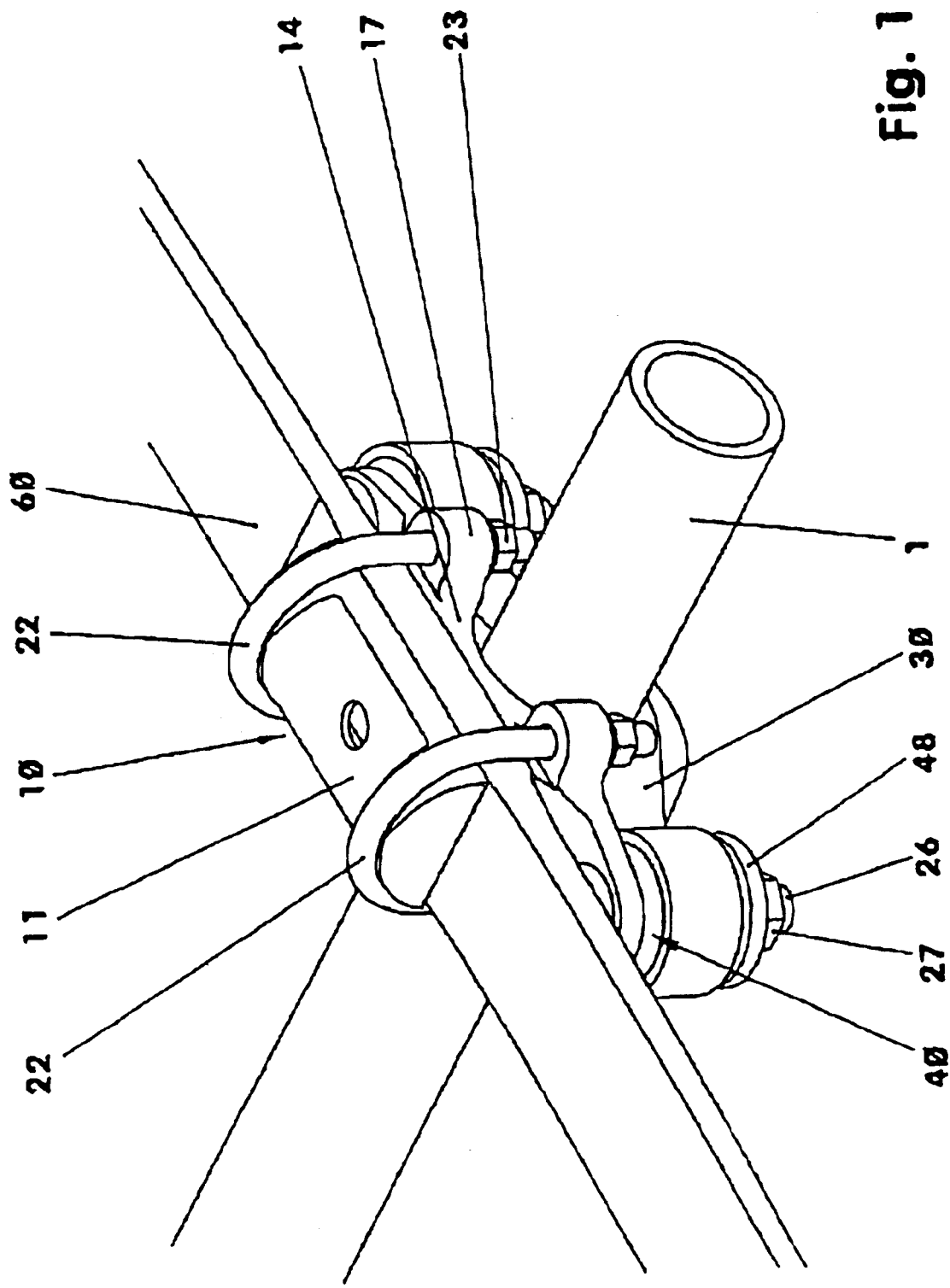
FIG. 1 is a schematic view of a coupling between the axle member and the leaf spring.
Figure 2:
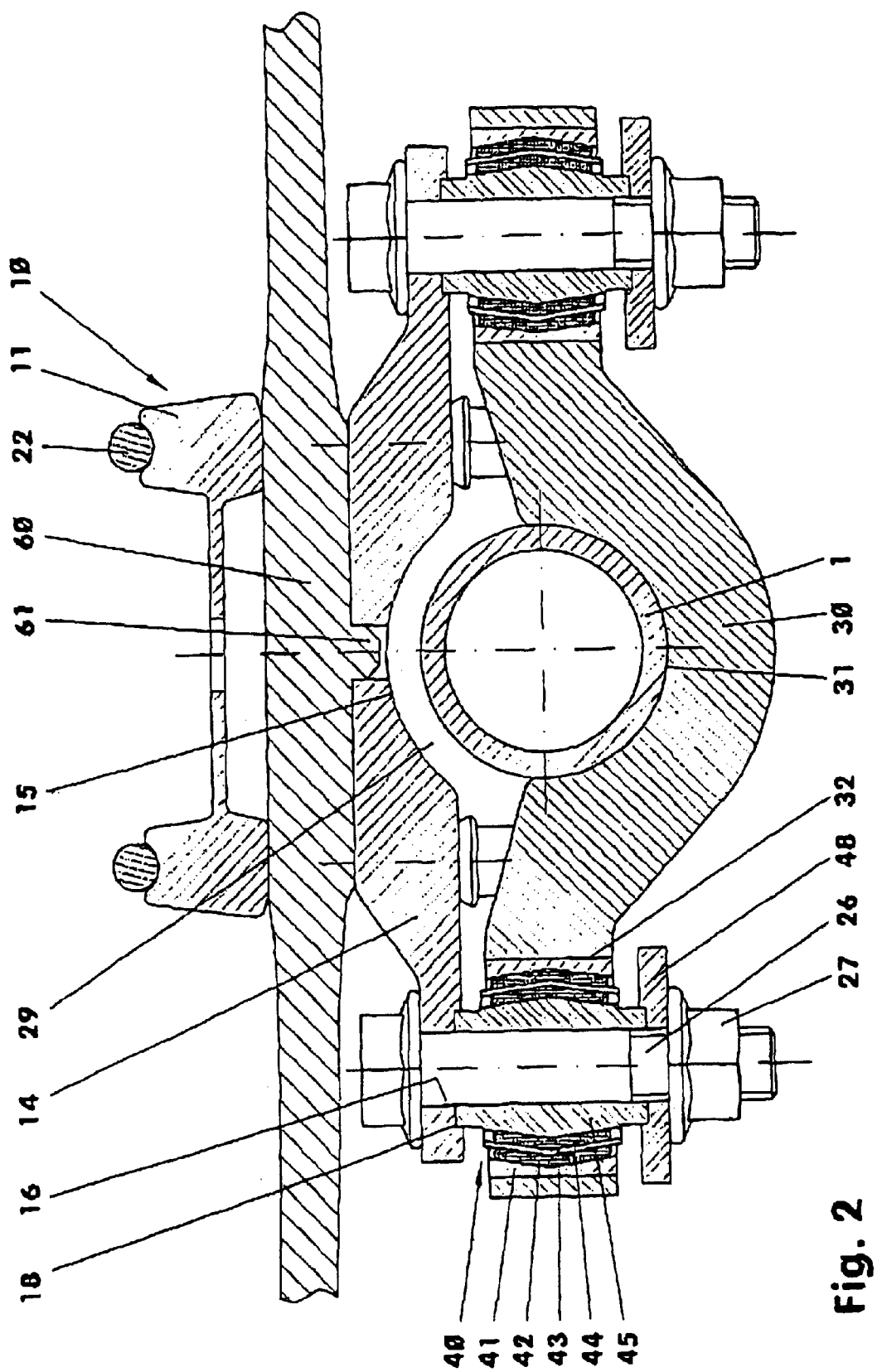
FIG. 2 is a cross-sectional view through the coupling.

FIGS. 1 and 2 illustrate the fastening of an axle member (1) to a leaf spring (60). The axle member (1) is fastened to the leaf spring (60) by a supporting strap (30), spring/damper elements (40) and the fastening subassembly (10).

In the region of the leaf spring (60), for example, the axle member (1) is a round steel tube, on the end of which the wheels are mounted in a conventional manner.

The fastening subassembly (10) includes the upper spring plate (11), which is attached to the leaf spring (60) by the shackles (22) and the lower spring plate (14).

In the example embodiment of the present invention, the upper spring plate (11) is a component that is symmetrical to the axis both in the longitudinal and in the transverse direction. In the vicinity of the ends of the longitudinal axis, the component has a cross-section in the form of a circular segment. The underside is flat. In the middle of the component, there is a hole. The upper spring plate (11) may also be split transversely.

As illustrated in FIGS. 1 and 2, the lower spring plate (14) is likewise a component that is symmetrical to the axis both in the longitudinal and in the transverse direction. This component is offset at both longitudinal ends, both ends being parallel to the flat upper side of the component. In the transverse direction, parallel to the transverse axis, there are two lugs (17), which are arranged below the level of the central upper side of the component, for example. These lugs (17) include the holes through which the shackles (22) are inserted. In the outer region of the longitudinal axis, the underside of the component is parallel to the upper side of the component, the underside having a recess (15) between the two offset ends. In the two outer offsets there are holes (16) configured to receive the retention bolts (26) and countersunk centering recesses (18) are formed on the underside of these holes. The offsets may be eliminated if threads are provided instead of the holes (16). There is a centering hole for form-locking fixing to the leaf spring (60) in the center of the component.

In the example embodiment of the present invention, the structural shape of the shackles (22) is that of a semi-oval.

The supporting strap (30) illustrated in FIGS. 1 and 2 is an approximately dumbbell-shaped component, for example. At its ends there are tubular lugs, while the central area is narrow when viewed from above. This component has an approximately constant height. At the center of the longitudinal axis there is a recess (31) in the form of a circular segment with an axis which is parallel to the tube of the axle member (1) and the center of which is on a level with the centers of the lateral lugs. This component may be produced by casting, forging or as a welded structure, for example. In the lugs there are holes (32), these having a vertical axis for example.

In the example application, the spring/damper elements (40) are constructed from an outer tube (41), an outer elastomer body component (42), a dividing sleeve (43), an inner elastomer body component (44) and an inner tube (45), which are all concentric, one inside the other.

The inner tube (45) is longer than the other parts of the spring/damper element (40) and projects by an equal amount at the top and bottom in this case.

Regarding its outer contour, the outer tube (41) is a cylindrical component. In contrast, the diameter of its inner contour increases conically from the two outer ends towards the center.

The individual elastomer body is shorter than the outer tube and is divided by a dividing sleeve (43) into two separate parts (42, 44). While having a constant thickness, the parts have the maximum inside and outside diameter in the center.

The dividing sleeve (43) includes two halves in the form of frustoconical shells, the larger diameters of which merge into one another.

Regarding its inside diameter, the inner tube (45) is a component in the form of a cylindrical shell. At the outer ends, the outside diameter is cylindrical but increases in a conical manner towards the center.

At the center, each of the washers (48) includes a hole. The holes are additionally countersunk on one side.

In the example embodiment of the present invention, the leaf spring (60) is a single-layer semi-elliptical longitudinal leaf spring. In the region of the fastening subassembly (10), the upper side and the underside are parallel, while, outside this area, the leaf spring (60) tapers outwardly. Arranged at the center of the area of the fastening subassembly (10) is the center bolt (61).

In the example embodiment of the present invention, the supporting strap (30) is welded to the axle member (1) so that the holes (32) are vertical. The spring/damper elements (40) are pressed into the holes (32) until the outer tubes (41) are flush with the supporting strap (30). The supporting strap (30) may also be connected to the axle member (1) by casting or connected to it by appropriate connecting elements.

In the example embodiment of the present invention illustrated in FIGS. 1 and 2, the lower spring plate (14) with the inserted retention bolts (26) is positioned from below in the center bolt (61) of the leaf spring (60), while the spring plate (11) is placed on the leaf spring (60) from above. The upper (11) and lower (14) spring plate are screwed to the leaf spring (60) with the spring shackles (22) and the nuts (23).

The axle member (1) with the supporting strap (30) and the spring/damper elements (40) is inserted into the retention bolts (26). During this process, the inner tubes (45) of the spring/damper elements (40) are centered in the countersunk recesses (18) of the lower spring plate (14). After mounting and centering the washers (48) on the inner tubes (45), the retention nuts (27) are screwed on.

The orientation of the retention bolts (26) may be reversed, i.e., the heads of the bolts may also be at the bottom. It is also possible to use pins instead of the retention bolts (26). As an alternative, retention bolts and/or pins may also be formed integrally on the lower spring plate (14) or on the supporting tube (30).

In the low-frequency range, the compliance of the leaf spring determines the vibration behavior of the structure while in the higher-frequency range, which is the one critical for interior noise, transmission of structure-borne noise is reduced by the spring/damper elements (40), especially in the vertical direction. The higher dynamic mass at the center of the leaf spring (60) is used. This is additionally increased by the mass of the fastening subassembly (10). In combination with the soft spring/damper elements (40), this dynamic mass physically results in an increase in impedance that reduces the transmission of structure-borne noise.

From the roadway, the forces are transmitted sequentially to the axle member (1) by the wheel and the wheel bearing. The same applies to the alternating forces produced by the engine and the drive line. From the axle member (1), the forces are transmitted to the spring/damper elements (40) or elastomer body (40) via the supporting strap (30). Vertical forces cause axial displacement of the outer tube (41) relative to the inner tube (45). The clearance (29) between the lower spring plate (19) and the axle member (1) allows vertical movement of the axle member (1) and interlocking of these components with one another.

Vibrations caused by horizontal forces and acting on the axle member (1), such as those that occur during cornering and acceleration, are absorbed radially in the spring/damper elements (40). In this direction, the elements are made relatively stiff.

Combined stresses result in, inter alia, the twisting of the system about the axis of the wheel or center line of the axle member (1) and pivoting of the supporting strap (30) in the transverse direction relative to the leaf spring (60), approximately about the center of the axle. To prevent jamming in the region of the spring/damper elements (40), the ratio of the distance between the spring/damper elements (40) transversely to the longitudinal axis of the vehicle to the distance between the spring/damper elements (40) in the longitudinal direction of the vehicle on one side of the vehicle may be less than 10:1. The maximum angle by which the outer tubes (41) may be tilted relative to the retention bolts (26) without metal-to-metal contact should always be greater than the maximum angle by which the axle member (1) including the supporting strap (30) tilts relative to the horizontal surface of the roadway. To ensure this, the radial thickness of the elastomer elements should be in a defined ratio to the longitudinal extent of the elastomer bodies. To match the introduction of forces to the stressing, the spring/damper elements (40) may also be arranged obliquely. By an appropriate choice of the characteristic of the elastomer bodies, e.g., a progressive characteristic, combined with the lever arm of the supporting strap, it is possible to absorb braking and driving torques and eliminate stops.

To limit the movements of the spring/damper elements (40), these may include separate or integral stops, especially when using elastomer bodies (40) with a linear characteristic. The spring/damper elements (40) may also be arranged to have a purely vertical action and the elastomer bodies may be split longitudinally or transversely. The elastomer elements (42, 44) may furthermore have an external convex curvature and an internal concave curvature in order, for example, to achieve an approximation to a ball joint. The outer tubes (41) and the inner tubes (45) of the spring/damper elements (40) may also be cylindrical or conical on the mutually facing contours, and, in the case of the conical arrangement, the slopes of the cones may be unequal. Correspondingly, the elastomer elements (42, 44) between the outer tubes (41) and inner tubes (45) may have different wall thicknesses over their length.

Instead of being based an elastomer springs, the principle of action of the spring/damper elements (40) may also be based on fluid-mechanical springs.

A combination of both principles of action is likewise possible.

The present invention allows soft coupling between the axle member and the leaf spring or longitudinal link in the vertical direction, this being definitive for the acoustics and unproblematic for ride dynamics, and a stiff connection in the transverse and longitudinal directions of the vehicle, which is advantageous for the ride dynamics. The positioning of the soft coupling at the center of the leaf spring improves acoustic decoupling since the dynamic mass localized there is greater than, for example, at the ends of the leaf spring. With this type of coupling, it is possible to eliminate the conventional tubular elastomer elements at the ends of the leaf spring, which are soft in the transverse direction of the vehicle and hard in the vertical and longitudinal directions of the vehicle. This arrangement provides an economical mounting that is designed for the high working loads required in the transport sector.

To take account of the eventuality that the elastomer body might fail, stops with, for example, curved contact surfaces may be provided between the supporting strap (30) and the lower spring plate (14), allowing defined contact without limiting the mobility of the axle member (1).

What is claimed is:

1. A coupling of an axle member to one of a vehicle leaf spring and a spring-loaded longitudinal link, comprising:

at least two separate spring/damper elements arranged between the axle member and the one of the leaf spring and the longitudinal link, the one of the leaf spring and the longitudinal link coupled to a section of the axle member, the spring/damper elements being arranged relative to a direction of travel in front of and behind the section of the axle member to which the one of the leaf spring and the longitudinal link is coupled, the spring/damper elements being arranged by approximately vertically aligned fastening devices, a stiffness of the spring/damper elements being greater in a horizontal direction than in a vertical direction.

2. The coupling according to claim 1, wherein the spring/damper elements are arranged on a same level as the section of the axle member to which the one of the leaf spring and the longitudinal link is coupled.

3. The coupling according to claim 1, wherein the coupling is arranged at a location of the leaf spring of greatest localized mass.

4. The coupling according to claim 1, wherein the spring/damper elements have a progressive characteristic.

5. A coupling of an axle member to one of a vehicle leaf spring and a spring-loaded longitudinal link, comprising:

at least two separate spring/damper elements arranged between the axle member and the one of the leaf spring and the longitudinal link, the spring/damper elements being arranged relative to a direction of travel in front of and behind a section of the axle member to which the one of the leaf spring and the longitudinal link is coupled, the spring/damper elements being arranged by approximately vertically aligned fastening devices, a stiffness of the spring/damper elements being greater in a horizontal direction than in a vertical direction;

wherein at least one of the spring/damper elements includes an elastomer body, the elastomer body including an outer contour and an inner contour having an at least approximately tubular elastomer element reinforced by sleeves at least in partial areas of the outer and inner contour.

6. The coupling according to claim 5, wherein the elastomer body is aligned vertically with a center line.

7. The coupling according to claim 6, further comprising a supporting strap, the axle member supporting the elastomer body via the supporting strap.

8. The coupling according to claim 5, further comprising a fastening device arranged on the one of the leaf spring and the longitudinal link, the fastening device being configured to rigidly support an inner sleeve of the elastomer body.

9. The coupling according to claim 5, wherein:

the sleeves include a dividing sleeve; and the dividing sleeve is integrated into the elastomer body, the elastomer body substantially surrounding the dividing sleeve.

10. The coupling according to claim 9, wherein the dividing sleeve includes an outside diameter and an inside diameter, the outside diameter and the inside diameter increasing toward a center of the dividing sleeve, the dividing sleeve having a constant wall thickness.

* * * * *

UNITED STATES PATENT AND TRADEMARK OFFICE
CERTIFICATE OF CORRECTION

PATENT NO. : 6,616,162 B2
DATED : September 9, 2003
INVENTOR(S) : Machens et al.

It is certified that error appears in the above-identified patent and that said Letters Patent is hereby corrected as shown below:

Column 3,
Line 66, after "body" delete "40";

Column 4,
Line 36, after "bodies" delete "40"; and
Line 50, after "based" change "an" to -- on --.

Signed and Sealed this

Tenth Day of August, 2004

JON W. DUDAS
*Acting Director of the United States Patent and Trademark Office*